US012324032B2

(12) United States Patent
Garcia

(10) Patent No.: US 12,324,032 B2
(45) Date of Patent: Jun. 3, 2025

(54) SYSTEMS AND METHODS FOR MANAGING WISP VOUCHER CODES FOR TRANSPORTATION VEHICLES

(71) Applicant: Panasonic Avionics Corporation, Irvine, CA (US)

(72) Inventor: Leonardo Garcia, Foothill Ranch, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 413 days.

(21) Appl. No.: 18/072,996

(22) Filed: Dec. 1, 2022

(65) Prior Publication Data

US 2024/0188151 A1 Jun. 6, 2024

(51) Int. Cl.
*H04W 76/11* (2018.01)
*H04W 4/40* (2018.01)
*H04W 12/08* (2021.01)

(52) U.S. Cl.
CPC .............. *H04W 76/11* (2018.02); *H04W 4/40* (2018.02); *H04W 12/08* (2013.01)

(58) Field of Classification Search
None
See application file for complete search history.

(56) References Cited

U.S. PATENT DOCUMENTS

| 10,136,293 | B1 * | 11/2018 | Rabii | H04W 8/005 |
| 11,101,874 | B1 * | 8/2021 | Yerli | H04L 67/12 |
| 2018/0255491 | A1 * | 9/2018 | Rabii | H04W 4/023 |
| 2018/0317071 | A1 * | 11/2018 | Rabii | H04W 12/50 |
| 2020/0216176 | A1 * | 7/2020 | Ma | H04W 4/48 |
| 2020/0249822 | A1 * | 8/2020 | Penilla | G06F 3/0488 |
| 2021/0266741 | A1 * | 8/2021 | Kwatra | H04W 12/06 |
| 2021/0291985 | A1 * | 9/2021 | Chen | H04N 21/2146 |

* cited by examiner

*Primary Examiner* — Anh Vu H Ly
(74) *Attorney, Agent, or Firm* — LOZA & LOZA, LLP

(57) ABSTRACT

Methods and systems are provided for a transportation vehicle. One method includes generating Wireless Internet Service Provider ("WISP") voucher codes and associated WISP data into a loadable package to establish Internet connections on a plurality of aircrafts; utilizing the associated WISP data to selectively load a subset of WISP voucher codes to an aircraft; deploying a WISP voucher code from the subset for each passenger seat on the aircraft, based on an event; updating a data structure upon deployment of each WISP voucher code to indicate deployed and unused WISP voucher codes of the subset; presenting the WISP voucher code to each passenger seat; determining that a number of unused WISP voucher codes of the subset have reached a threshold value; obtaining additional WISP voucher codes for the aircraft; and deleting the WISP voucher code associated with each passenger seat, upon flight termination.

20 Claims, 9 Drawing Sheets

US 12,324,032 B2

SYSTEMS AND METHODS FOR MANAGING WISP VOUCHER CODES FOR TRANSPORTATION VEHICLES

TECHNICAL FIELD

The present disclosure relates to transportation vehicles in general, and more particularly, to innovative technology for generating, deploying, and tracking Wireless Internet Service Provider ("WISP") voucher codes on transportation vehicles.

BACKGROUND

Transportation vehicles, for example, aircraft, trains, buses, recreation vehicles, boats and other similar vehicles, use various computing/electronic devices (interchangeably referred to as computing devices) for providing various functions, including entertainment, system control, content storage, and other functions. These computing devices include hardware (for example, servers, switches, network interface cards, storage adapters, storage devices, seat devices, smart monitors, and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment"/"in-flight entertainment and communication" or "IFE"/"IFEC" systems (interchangeably referred to as "IFE").

Wireless Internet connectivity on aircrafts and other transportation vehicles is enabled using WISP voucher codes. A WISP voucher code is a unique set of values (alpha numeric including special characters) that are used by an Internet provider to establish an Internet connection. Typically. WISP voucher codes are generated and printed by Internet providers and given to airlines. The WISP voucher codes are then presented to passengers by airline personnel. Manual distribution of WISP codes on aircrafts is cumbersome and inefficient. Continuous efforts are being made to develop computing technology for better managing distribution and deployment of WISP voucher codes on aircrafts and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
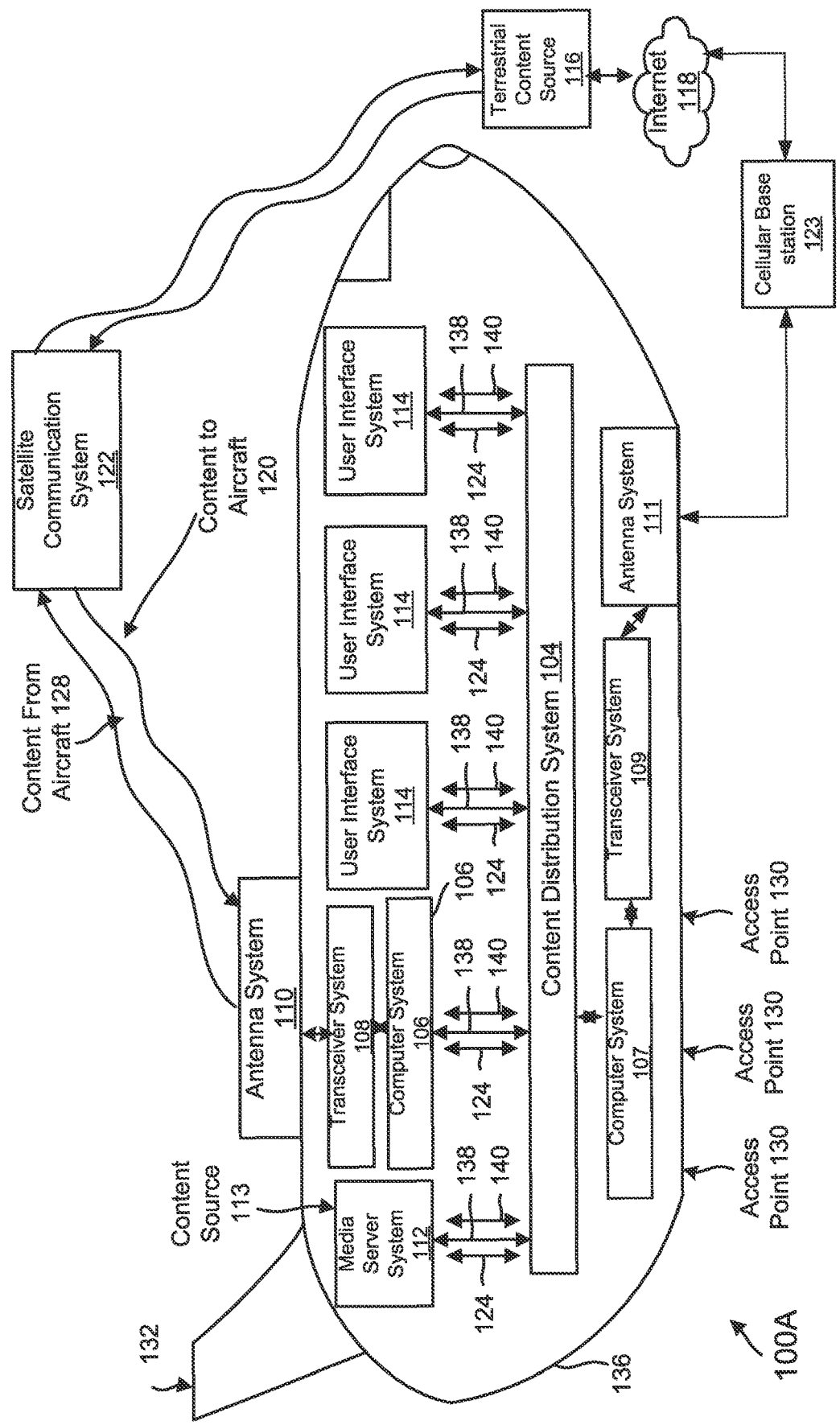
FIG. 1A shows an example of an operating environment for implementing the various aspects of the present disclosure on an aircraft.

In one aspect, innovative technology is described herein for generating, loading, deploying, and tracking WISP voucher codes on aircrafts or any other transportation vehicle. A processor executable. WISP generator creates a certain number of voucher codes, e.g., for an airline. The WISP generator also generates a WISP voucher code report (also referred to as associated WISP data). The report and the WISP voucher codes are formatted into a loadable package. The package may be uploaded to a repository. A processor executable deployment tool loads the WISP package on one or more aircrafts.

The WISP voucher codes are deployed at each passenger seat after an event. e.g., when a flight takes off, at a particular altitude, or any other configurable event. A passenger seat device retrieves the WISP voucher code via an application programming interface (API) from another computing device and the WISP voucher code is displayed or electronically provided to each passenger. A crew terminal tracks the deployment/usage of WISP voucher codes that are sent to each passenger. Once the flight is over, the WISP voucher codes are deleted from passenger devices and crew terminal.

In another aspect, a processor executable WISP tracker tracks the deployment/usage of WISP codes on an aircraft. When the number of unused WISP voucher codes reaches a threshold value, the crew terminal is notified, and/or additional voucher codes are retrieved (e.g., from a ground system). Details regarding the innovative technology are provided below.

As a preliminary node, the terms "component", "module", "system", and the like as used herein are intended to refer to a computer-related entity, for example, a software-executing processor, hardware, firmware or a combination thereof. For example, a component may be, but is not limited to being, a process running on a hardware processor, a hardware processor, an object, an executable, a thread of execution, a program, and/or a computer.

By way of illustration, an application running on a server and the server can be a component. One or more components may reside within a process and/or thread of execution, and a component may be localized on one computer and/or distributed between two or more computers. Also, these components can execute using one or more non-transitory, computer readable media having data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit). CD (compact disc), DVD (digital video disk). ROM (read only memory), hard disk. EEPROM (electrically erasable programmable read only memory), solid state memory device or any other storage device, in accordance with the claimed subject matter.

Vehicle Information System: FIG. 1A shows an example of a vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Irvine, California, the assignee of this application.

System 100A comprises at least one content source 113 and one or more user (or passenger) media client user interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The media server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120. The media server system 112 may stream and/or otherwise transmit data stored on the storage system to content distribution system 104 to be played by a passenger using user interface system 114 (also referred to as a set device or a smart monitor).

For example, one type of content that may be transmitted to user interface system 114 comprises viewing content 124. The viewing content 124 can comprise any conventional type of audio and/or video viewing content, such as stored (or time-delayed) viewing content and/or live (or real-time) viewing content. As desired, the viewing content 124 can include geographical information. Alternatively. and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a cellular base station 123 that communicates through an antenna 111 to a transceiver system 109 and a computer system 107. The functionality of computer system 107 is similar to computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as a network device that provides access to the Internet 118, e.g., using a WISP voucher code used by a provider to grant access to the Internet. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. Transceiver system 108 is preferably configured to both send and receive data to any suitable content source device. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interface systems 114 including an IFE or a personal electronic device (PED), as desired. Although shown and described as being separate systems for purposes of illustration, the computer system 106 and the media server system 112 can be at least partially integrated, and in some aspects comprises a single computer system.

The user interface system 114 may comprise computing terminals/smart monitors in communication with a wireless access point 130, for example, a port that user interface system 114 plugs into. The user interface system 114 provides a display device to view content, for example, a screen having a keyboard or a touchscreen. The user interface system 114 includes a hardware interface to connect to an access point 130 to provide a wired and/or a wireless connection using a WISP voucher code for the user interface system 114 to interface with.

In at least one aspect, the user interface system 114 comprises a software application that a user downloads and installs on a PED to receive and view content via an access point 130, described below in detail. While bandwidth limitation issues may occur in a wired or wireless system on a vehicle, such as an aircraft 132, in general a system bus of the vehicle information 100A system is configured to have sufficient bandwidth to support data transfers for all user interface systems 114 aboard the vehicle, i.e., devices used by passengers.

The user interface system 114 can include an input system (not shown) for permitting the user (or passenger) to communicate with system 100A, such as via an exchange of control signals 138. Illustrative user instructions 140 can include instructions for initiating communication with the content source 113 by entering a WISP voucher code, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, API, a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
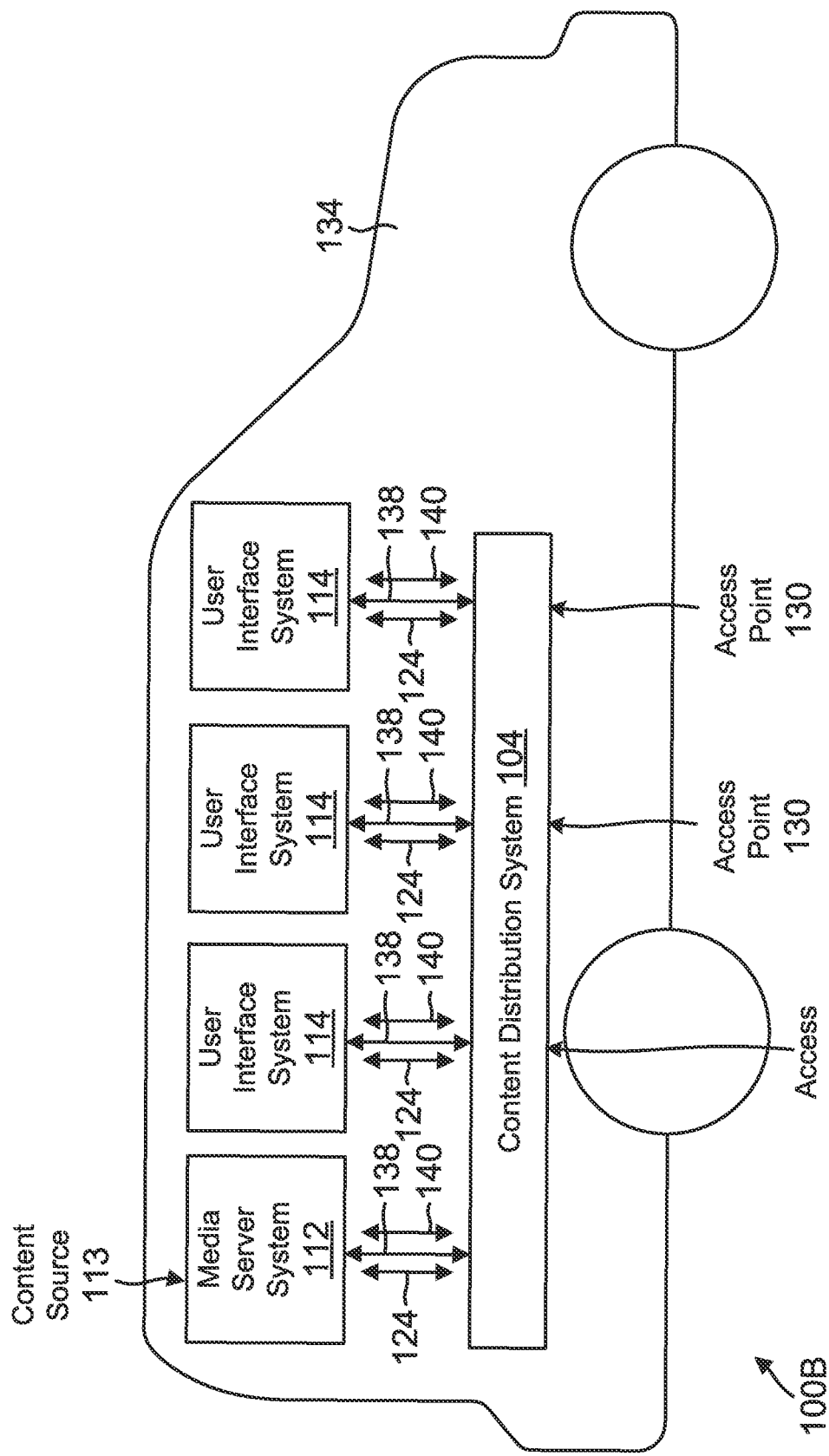
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
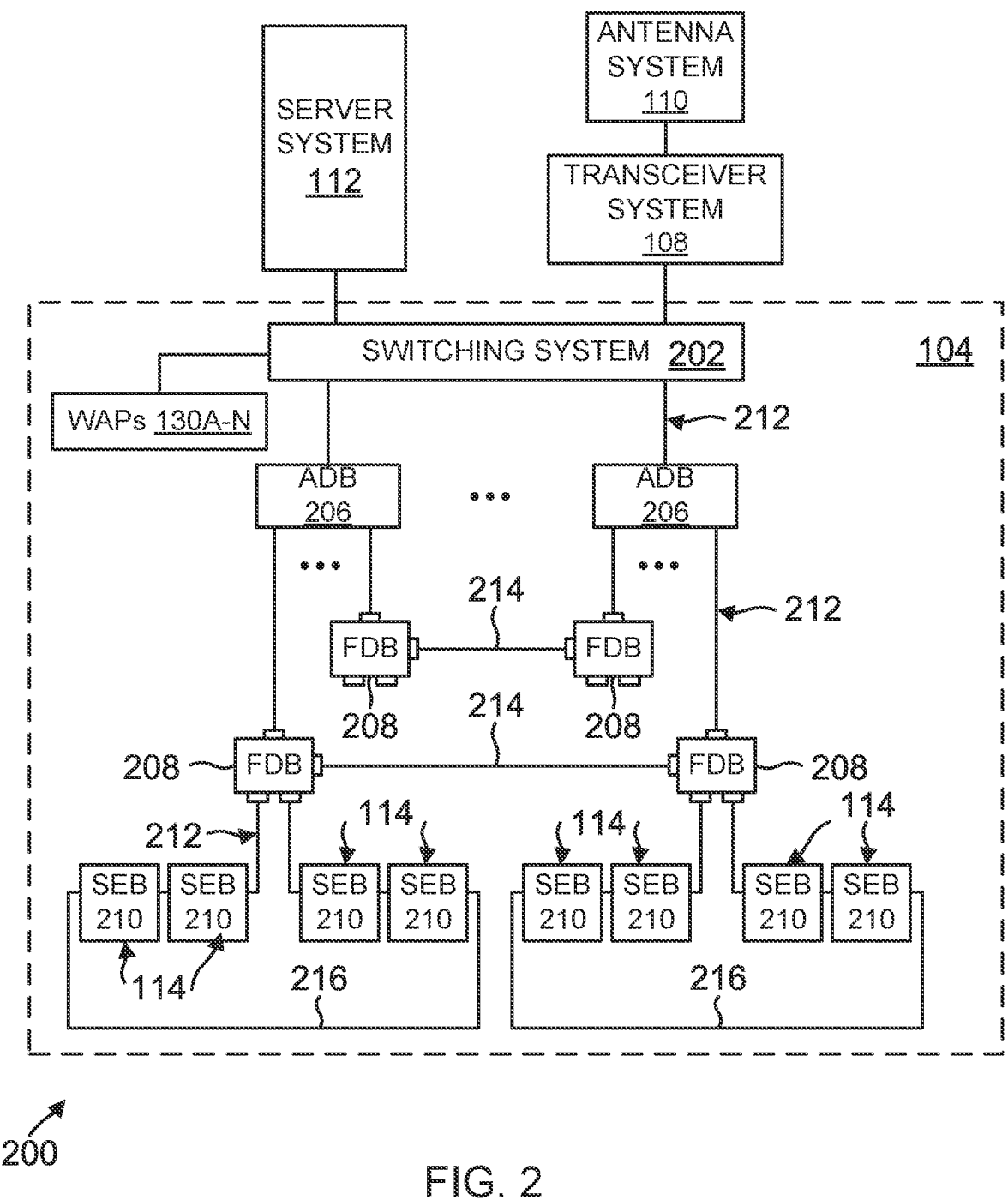
FIG. 2 shows an example of a content distribution system on an aircraft, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of media client systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. In some aspects, the content distribution system 104 may comprise a fiber optic network. To achieve high data transfer rates in a wireless communications environment, free-space optics (or laser) technology, millimeter wave (or microwave) technology, and/or Ultra-Wideband (UWB) technology can be utilized to support communications among the various system resources, as desired, for example, a 5G network.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or VSEBs and/or PSEBs) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more WAPs (130A to 130N) connected in communication with the switch system 202 for wireless distribution of content to user interface systems 114 including PEDs using WISP voucher codes.

Each of the area distribution boxes 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface system 114. Each SEB 210 can support one or more of the user interface systems 114.

The switching systems 202, the ADBs 206, the FDBs 208, the SEBs (and/or VSEBs, and/or PSEBs) 210, the antenna system 110 (and/or 111, FIG. 1A), the transceiver system 108 (and/or 109, FIG. 1A), the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The content distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of SEBs 210 for a selected FDB 208 as shown in FIG. 2. Each SEB loopback connection 216 therefore forms a loopback path among the daisy-chained SEBs 210 coupled with the relevant FDB 208.

It is noteworthy that the various aspects of the present disclosure may be implemented without using FDB 208. When FDB 208 is not used. ADB 206 communicates directly with SEB 210 and/or server system 112 may communicate directly with SEB 210 or the seats. The various aspects of the present disclosure are not limited to any specific network configuration.

Figure 3A:
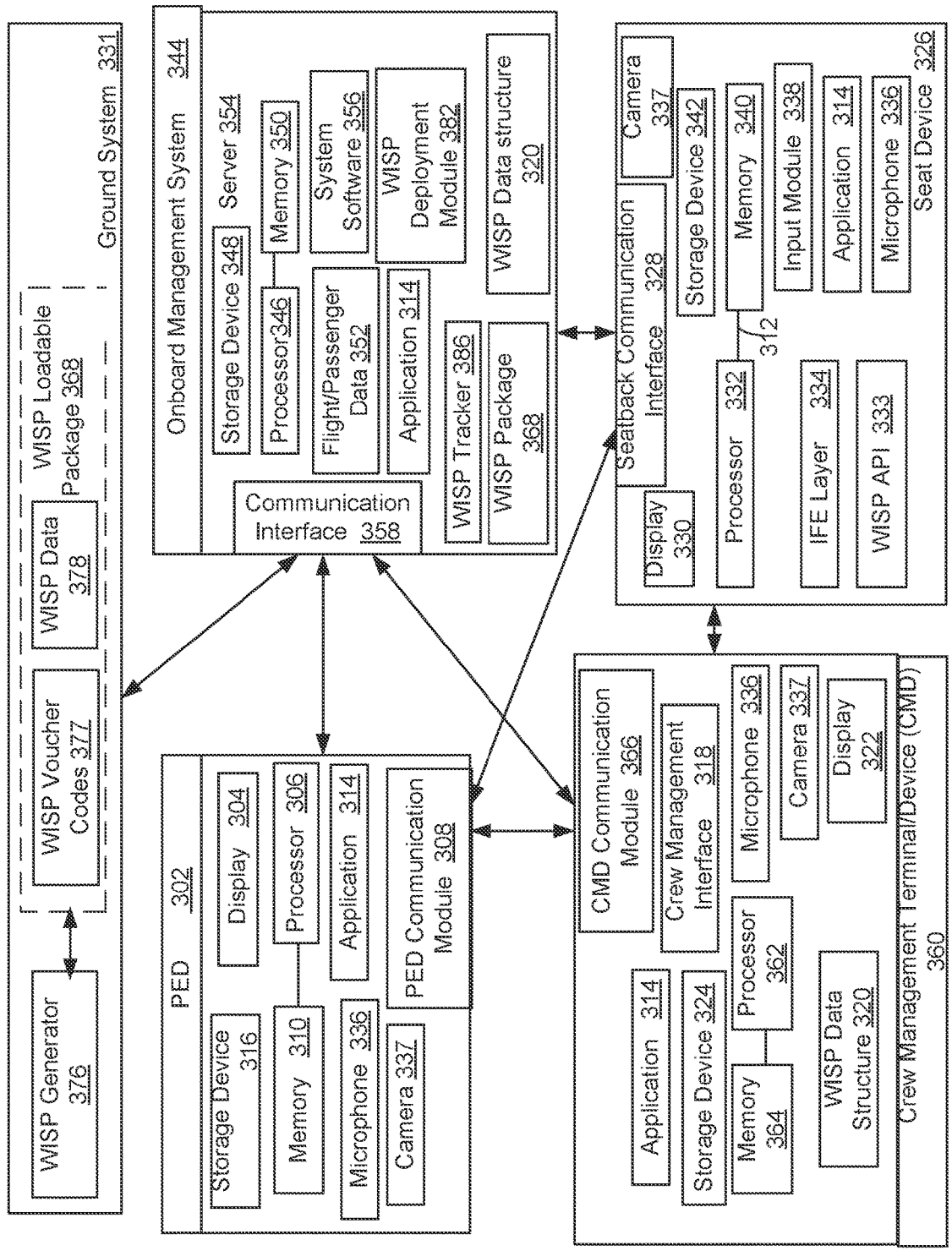
FIG. 3A shows an example of an overall system for loading, deploying and tracking WISP voucher codes on an aircraft, according to one aspect of the present disclosure.

System 300: FIG. 3A shows an example of a system 300 for an aircraft (or any other transportation vehicle including a train, a bus, a ship or any other commercial transportation vehicle) for generating, loading, deploying and tracking WISP voucher codes, according to one aspect of the present disclosure. System 300 includes a ground system 331 having one or more computing devices, an onboard management system 344, a PED 302, a crew management terminal (or device) (CMD) 360, and a seat device 326 configured to cooperate with one another to provide media content to a passenger. The passenger may consume media content via either seat device 326, for example, an IFE system or a touchscreen computer system 9 e.g., user system 114, FIG. 1A), or may consume media content via PED 302, for example, a tablet computer system (or a mobile device) having an application 314 installed on the tablet computer system. In another aspect, system 300 may not include a seat device 326 or may not include a PED 302. The onboard management system 344 may be similar to computer systems 106/107 and/or server 112 described above with respect to FIGS. 1A/1B.

Figure 3B:
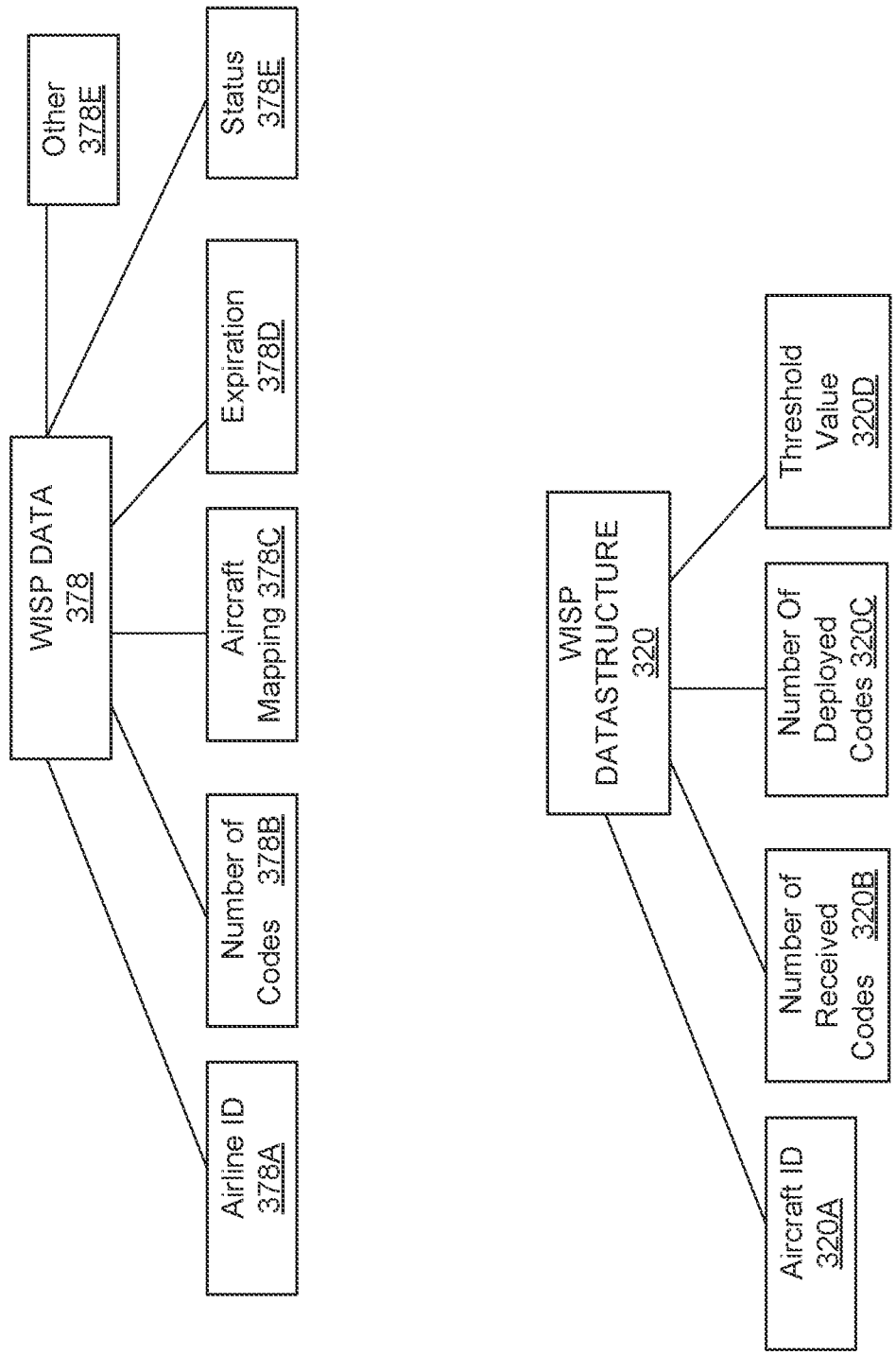
FIG. 3B shows an example of various data structures used for managing WISP voucher codes on an aircraft, according to one aspect of the present disclosure.

In one aspect, the ground system 331 includes a processor executable WISP generator 376 that generates WISP voucher codes 377 and a report, shown as WISP data 378. FIG. 3B shows an example of WISP data 378 that identifies an airline using an airline identifier 378A, the number WISP voucher codes 378B that have been generated, an aircraft mapping 378C that maps a range of WISP voucher codes to an aircraft identifier identifying a specific aircraft, an expiration data 378D, a status of each code 378E indicating if the code has been deployed and any other information 387E. In one aspect, the WISP data 378 is a report that is provided to each airline. The WISP codes 377 and WISP data 378 are packaged into a WISP loadable package 368. The WISP loadable package 368 may be loaded directly to an aircraft or to a software repository, e.g., a cloud-based system. The WISP codes 377 or a portion thereof are loaded to a specific aircraft based on the aircraft mapping 378C.

In one aspect, the onboard management system 344 includes a server 354 (similar to, or comprising, the media server 112 and/or computer systems 106/107). The server 354 includes a processor 346 that has access to a memory 350 via a bus system/interconnect (similar to 312). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, a WISP data structure 320, WISP package 368, passenger data 352, and other information) applications and program files, including system software 356, application 314, a WISP tracker 386, a WISP deployment module 382, and others. While the WISP tracker 386 and the WISP deployment module 382 are shown as separate blocks, they may interface or may be included within system software 356 and/or application 314.

System software 356 of the onboard management system 344 is executed by the processor 346 to control the overall operation of the server 354. In some respects, system software 356 may be configured to communicate with a PED, such as PED 302, to allow a passenger to download application 314 using an authorized PED 302 for accessing digital content.

In one aspect, the onboard management system 344 maintains flight and passenger data 352 (may be referred to as data 352), for example, flight itinerary including origin location, layover locations, destination location, language preference for translating messages from one language to another, arrival time and other information. Data 352 may also include passenger data that uniquely identifies each passenger for a flight using a unique identifier, a seat assigned to a passenger, a language preference for the passenger, and any other information that can uniquely identify the passengers (including a unique identifier of the PED 302). Data 352 may also include passenger profile information, such as a preferred meal or a preferred drink by a passenger, preferred music, preferred thematic selections, or other preferences specific to the passenger. Data 352 may be retrieved from an airline ground system before flight departure and may be updated during flight.

In another aspect, server 354 stores WISP package 368 that includes a portion of WISP voucher codes 377 assigned for the aircraft, and the corresponding WISP data 378. The processor 346 is configured to execute the WISP deployment module 382 to deploy the assigned WISP voucher codes 377 to each passenger seat, as described below in detail. The WISP tracker 333 tracks the use of WISP voucher codes on the aircraft using the WISP data structure 320, an example of which is shown in FIG. 3B. WISP data structure 320 stores an aircraft identifier, the number of codes 320B received from the ground system 331, the number of codes 320C that are deployed on the aircraft and a threshold value 320D. The threshold value 320D indicates to the WISP tracker 386 when to notify the CMD 360 and/or obtain additional WISP voucher codes from the ground system 331 or any other entity, as described below in detail.

In one aspect, server 354 communicates with the CMD 360, PED 302 and/or seat device 326 via the communication interface 358. The communication interface 358 may also be used to receive information from the ground system 331, for example, the WISP loadable 368, passenger data 352 and other information. The communication interface 358 includes one or more interfaces for a wired and/or wireless connection, as described above with respect to FIGS. 1A/1B and 2.

In one aspect, the seat device 326 includes a display device 330, a processor 332, a memory 340, a communication interface 328, a local storage device 342 for storing content and optionally, a camera 337 for taking images and microphone 336 for receiving voice commands. As an example, seat device 326 receives user input/requests (e.g., a WISP voucher code) via an input module 338. The input module 338 may be configured to use a local touch screen included with display 330, a local virtual keyboard, an external mouse, external keyboard and/or any other input device functionally connected to seat device 326.

Processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Processor 332 preferably executes one or more instructions saved on memory 340 to perform the functions described herein.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 is configured to execute an IFE layer 334 that provides in-flight entertainment and other options to passengers (e.g., controls for overhead light, interfacing with the crew, ordering food/drinks, and obtaining flight information). The IFE layer 334 provides audio/video content as well as controls for accessing the content. The IFE layer 334 uses the communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication. In another aspect, the communication interface 328 uses a WISP voucher code to establish an Internet connection. The WISP voucher code is retrieved by a WISP API 333 executed by the processor 332, as described below in detail. The WISP voucher code is displayed on display 330 or PED 302 and entered by a passenger to access the Internet. It is noteworthy that although the WISP API 333 is shown as a separate block, it can be integrated with the IFE layer 334.

In one aspect, the seat device 326 may be part of the user interface system 114 or configured to interface with the user interface system 114 also described above with respect to FIGS. 1A/1B. It is noteworthy that the seat device 326 may be mounted on the back of a seat or supported from other structures, such as a bulkhead, wall, arm of a seat, etc. The adaptive aspects of the present disclosure are not limited to any specific location or orientation of the seat device 326.

In one aspect, the PED 302 may be a mobile phone, a notebook, a tablet, a laptop or any other computing device. PED 302 may include a processor 306 that has access to a memory 310 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving a voice input from a passenger. The voice input can be converted into text by application 314. In another aspect, PED 302 may include a camera 337 that may be used by a passenger to upload digital images or take passenger images to determine if the passenger is asleep.

The PED 302 includes a storage device 316 that may be or may include any storage medium for storing data in a non-volatile manner, such as one or more magnetic or optical based disks, flash memory, or solid-state drive. The storage device 316 may be used to store content displayed on a display 304 of PED 302. In one aspect, display 304 may include a touch screen for receiving input commands. e.g., a WISP voucher code.

The storage device 316 may also store the application 314 that is executed by processor 306 out of memory 310. Application 314 may be used to pair the PED 302 with an aircraft system (for example, the IFE system) to receive content and communicate with aircraft crew.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect. PED 302 uses a PED communication module 308 to communicate with the seat device 326, when installed. In one aspect, PED communication module 308 may include one or more interfaces to communicate with different devices, including Wi-Fi interface. Bluetooth interface. NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In another aspect, CMD 360 may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect. CMD 360 includes a microphone 336 for receiving a voice input. CMD 360 may also include a display 322 to display information. Display 322 may also include a touch screen for receiving input commands. Display 322 may also be used to receive messages from passengers and display WISP voucher codes that have been deployed on the aircraft.

The CMD 360 includes a storage device 324 that may be or may include any storage medium for storing data in a non-volatile manner, such as one or more magnetic or optical based disks, flash memory, or solid-state drive. The storage device 316 may be used to store a crew management interface (CMI) 318 that may be executed out of memory 364, application 314 and WISP data structure 320 or a portion thereof.

The CMI 318 enables the CMD 360 to interface with the onboard management system 344 via a CMD communication module 366. The CMD 360 may present one or more APIs to the on-board management system 344 to retrieve passenger/flight data and update WISP data structure 320. The non-limiting API format and syntax will depend on the protocols used by the CMD 360 and the onboard management system 344.

In one aspect, the CMD 360 is configured to use the WISP data structure 320 to track WISP codes that are being used on the aircraft. The CMD 360 also receives messages from the server 354 when the number of deployed WISP voucher codes reaches the threshold value. In another aspect, the WISP tracker 386 is executed by processor 362 to track the deployed WISP voucher codes on the aircraft. The adaptive aspects of the present disclosure are not limited to any specific location for executing the WISP tracker 386.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface. Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

Figure 4A:
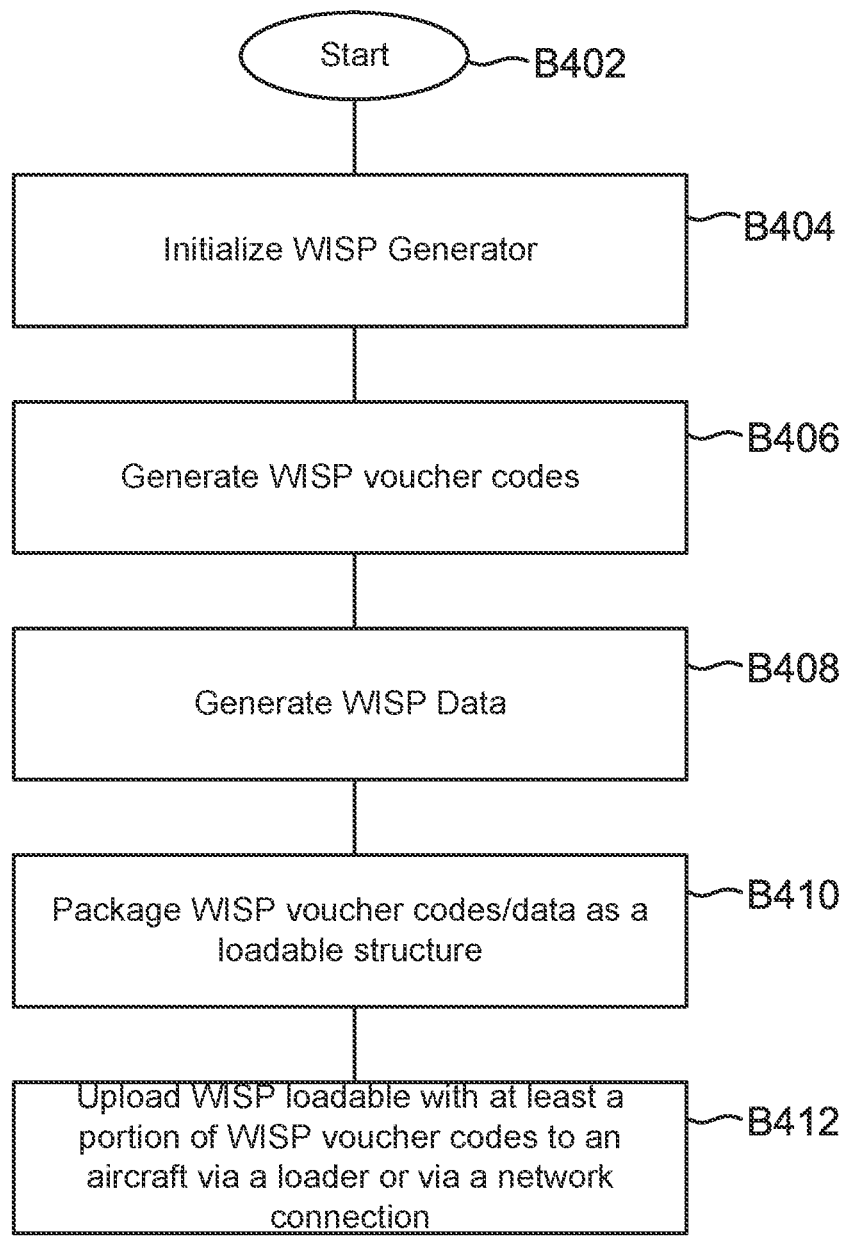
FIG. 4A shows a process for loading WISP voucher codes that are accessible to an IFE system, according to one aspect of the present disclosure.

Process Flow: FIG. 4A shows a process 40 for generating WISP voucher codes and loading the WISP voucher codes to one or more aircrafts, according to one aspect of the present disclosure. The process blocks of FIG. 4A are described with respect to an IFE system of an aircraft but are equally applicable to any transportation vehicle type.

Process 400 begins in block B402, when a computing device within ground system 331 is initialized and operational. The WISP generator 376 is initialized in block B404. In block B406, the WISP generator 376 generates WISP voucher codes 377. In one aspect, the WISP generator 376 includes a random number generator to generate random and unique WISP voucher codes 377. The WISP data 378 described above with respect to FIG. 3B is generated in block B408. The WISP voucher codes 377 and WISP data 378 are packaged as loadable package 368. In block B412, the WISP loadable package 368 is uploaded to an aircraft via a loader (not shown) or via a network connection from a repository (not shown).

In one aspect, based on the WISP data 378, only a portion of WISP voucher code 377 that are assigned to a specific aircraft are loaded on the aircraft.

Figure 4B:
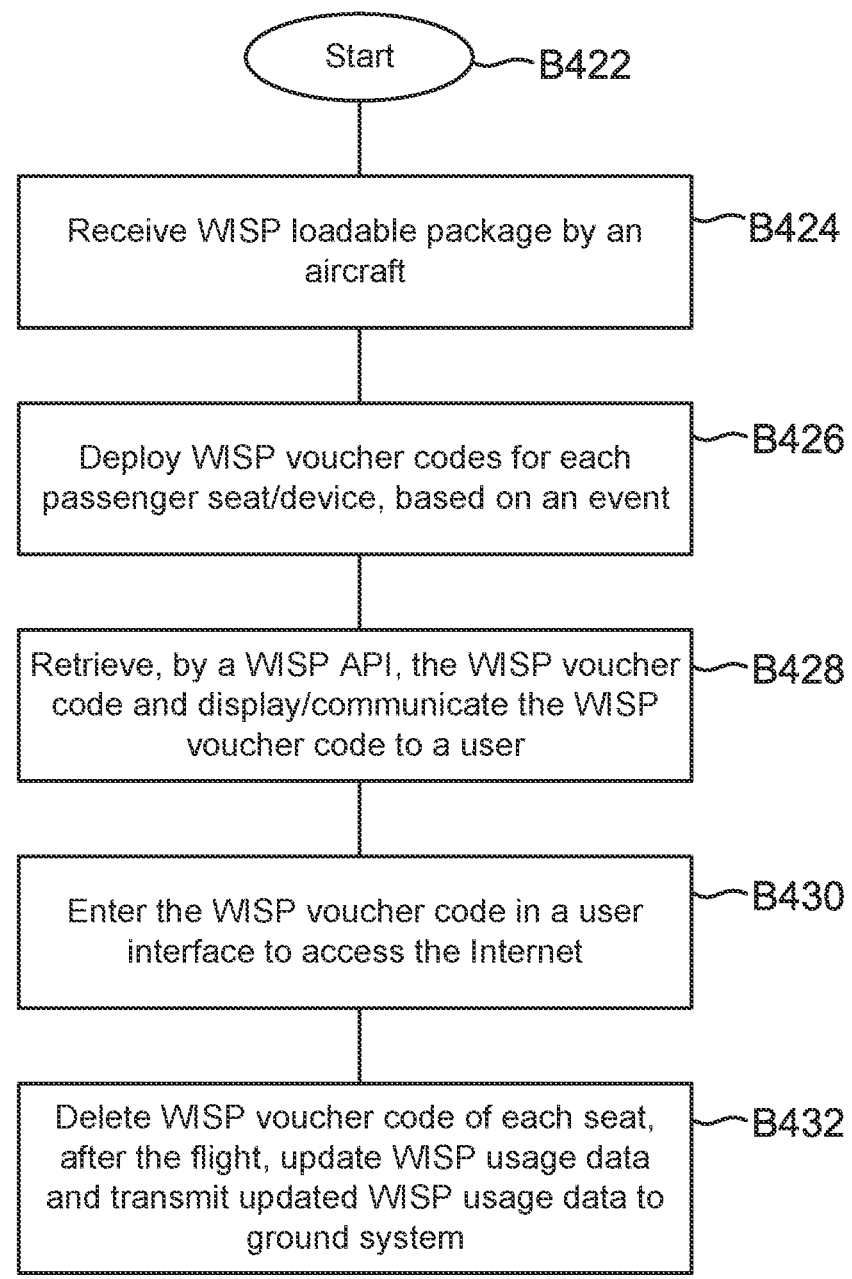
FIG. 4B shows a process for using WISP voucher codes by the IFE system, according to one aspect of the present disclosure.

FIG. 4B shows a process 420 for deploying the WISP voucher codes 477, according to one aspect of the present disclosure. Process 420 begins after process 400 has been executed. The WISP loadable package 468 is received by the authorized and designated aircraft in block B424. In one aspect, the WISP loadable package 368 is loaded to server 344. In another aspect, in a serverless system, the WISP loadable package 368 is received by a computing device on the aircraft configured to operate as a distributor of WISP voucher codes 377.

In block B426, the WISP voucher codes 377 are deployed to each passenger seat. This may mean notifying the seat device 326 and/or the paired PED 302. The WISP voucher codes 377 are deployed based on an event. e.g., flight status, altitude, or any other configurable event.

In block B428, the WISP API 333 retrieves the WISP voucher code assigned to the specific passenger/passenger seat. The WISP voucher code is communicated to the passenger, e.g., by displaying the code or via text message. In block B430, the passenger enters the code in a user interface that is presented to the user to establish an Internet connection. The user interface may be presented by application 314 or any other application. Once a WISP voucher code is used or deployed, the WISP tracker 386 updates the WISP data structure 320 to indicate the deployment/usage.

In block B432, after the fight is over or has landed, the WISP voucher codes are automatically deleted for each passenger device/seat device. The WISP data structure 320 and the WISP data 378 are updated. The updated information (i.e., the updated WISP data 378) is then provided to the ground system 331 that also tracks the usage of WISP voucher codes.

Figure 4C:
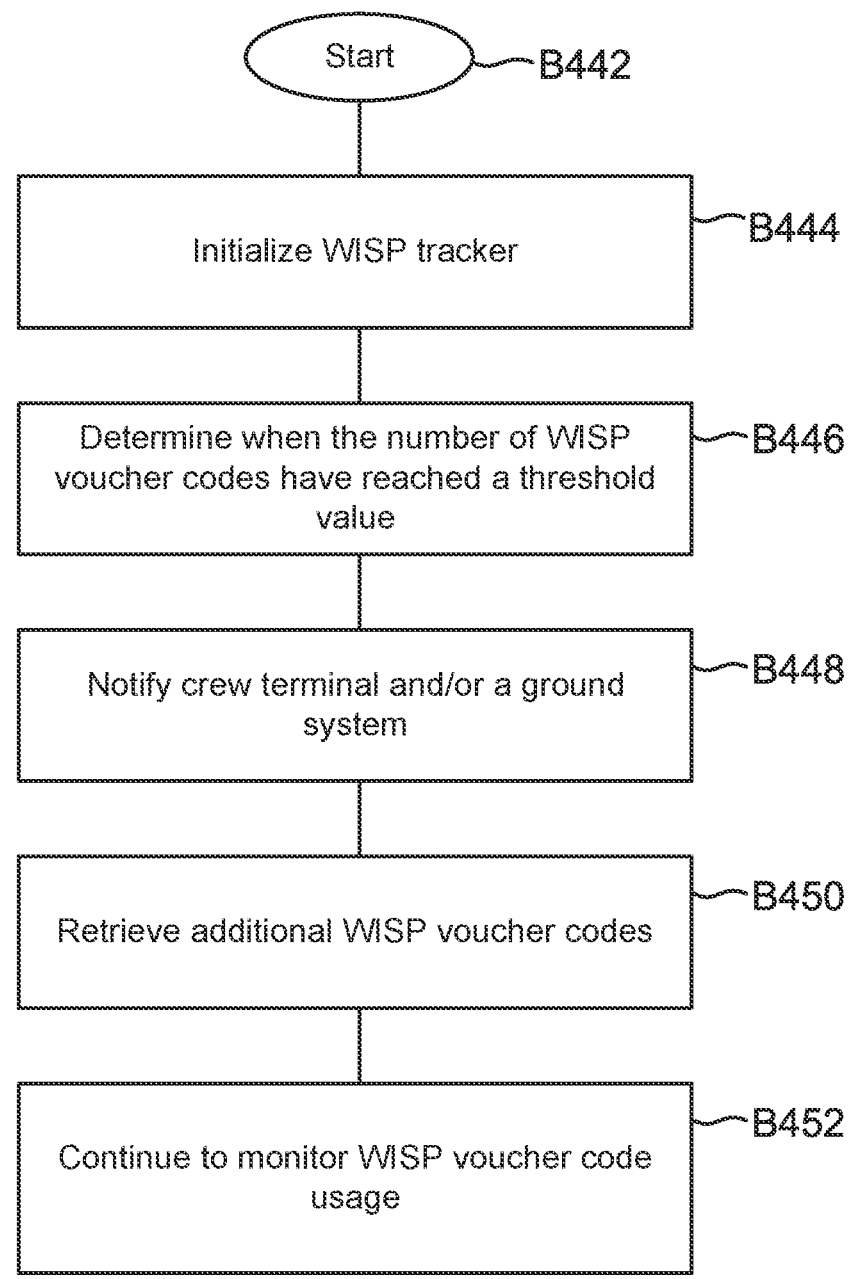
FIG. 4C shows a process for tracking usage of WISP voucher codes on an aircraft, according to another aspect of the present disclosure.

FIG. 4C shows a process 440 for tracking WISP voucher codes 477 on a flight, according to one aspect of the present disclosure. Process 440 begins in block B442, after process 400 has been executed. The WISP tracker 386 is initialized in block B444, before the WISP voucher codes are deployed and made available to the passengers. The WISP tracker 386 may use a counter (not shown) that counts the number of WISP voucher codes that are deployed in the aircraft. The counter value is compared with the threshold value 320D (FIG. 3B) in block B446. When the threshold value is reached, the CMD 360 and/or the ground system 331 is notified in block B448. In block B450, additional WISP voucher codes are retrieved from the ground system 331 or any other entity. The additional WISP voucher codes are deployed, and their usage is also tracked in block B452, and the process moves back to block B446.

In one aspect, methods and systems are provided for a transportation vehicle. One method includes generating (e.g., B406/B408, FIG. 4A) WISP voucher codes (e.g., 377, FIG. 3A) and associated WISP data (e.g., 378, FIG. 3C) into a loadable package (e.g., 368. FIG. 3A) to establish an Internet connections on a plurality of aircrafts; utilizing the associated WISP data to selectively load (e.g., B412, FIG. 4A) a subset of WISP voucher codes to an aircraft; deploying (e.g., B426, FIG. 4B) a WISP voucher code from the subset for each passenger seat on the aircraft, based on an event; updating (e.g., B432, FIG. 4B) a data structure (e.g., 320. FIG. 3B) upon deployment of each WISP voucher code to indicate deployed and unused WISP voucher codes of the subset; presenting (B428. FIG. 4B) the WISP voucher code to each passenger seat; determining (e.g., B446. FIG. 4C) that a number of unused WISP voucher codes of the subset have reached a threshold value (e.g., 320D, FIG. 3B); obtaining additional WISP voucher codes for the aircraft;

and deleting (e.g., B432. FIG. 4B) the WISP voucher code associated with each passenger seat, upon flight termination.

Figure 5:
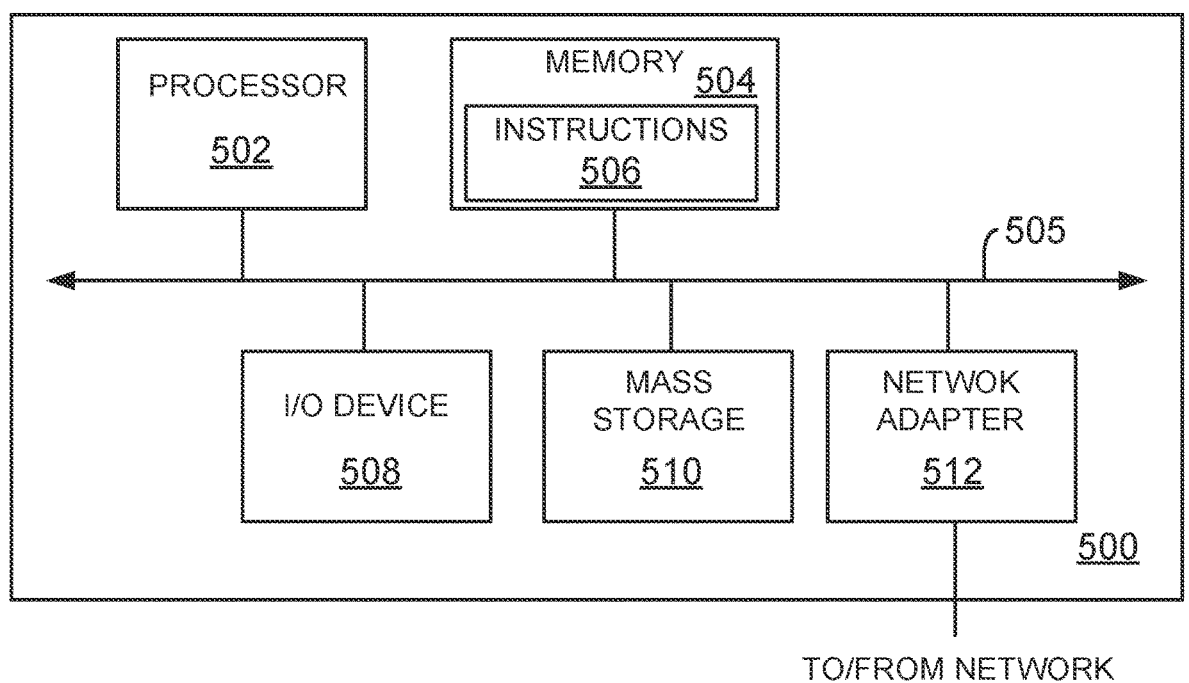
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent any computer system disclosed herein, for example, ground system 331. WISP generator 376, terrestrial content source 116, satellite communication system 122, computer system 106, media server system 112, user interface system 114, WAP 130, server 354, CMD 360. PED 302, seat device 326 or any user device that attempts to interface with a vehicle computing device. Note that certain standards and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement modules 382 and 386, application 314, WISP voucher codes 377. WISP data 378. WISP data structure 320 and/or the process blocks of FIGS. 4A-4C described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing WISP voucher codes have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
    generating Wireless Internet Service Provider ("WISP") voucher codes and associated WISP data into a loadable package to establish Internet connections on a plurality of aircrafts;
    utilizing the associated WISP data to selectively load a subset of WISP voucher codes to an aircraft;
    deploying a WISP voucher code from the subset for each passenger seat on the aircraft, based on an event;
    updating a data structure upon deployment of each WISP voucher code to indicate deployed and unused WISP voucher codes of the subset;
    presenting the WISP voucher code to each passenger seat;
    determining that a number of unused WISP voucher codes of the subset have reached a threshold value;
    obtaining additional WISP voucher codes for the aircraft; and
    deleting the WISP voucher code associated with each passenger seat, upon flight termination.

2. The method of claim 1, wherein the event is based on flight status.

3. The method of claim 1, wherein the event is based on a flight altitude.

4. The method of claim 1, further comprising:
    notifying a crew device, in response to reaching the threshold value.

5. The method of claim 1, wherein the additional WISP voucher codes are obtained from a ground computing system.

6. The method of claim 1, further comprising:
    utilizing the associated WISP data for loading a certain number of WISP voucher codes to each of the plurality of aircrafts uniquely identified by the associated WISP data.

7. The method of claim 1, further comprising:
    retrieving, by an application programming interface, the WISP voucher code of each passenger seat from a computing system of the aircraft.

8. A non-transitory machine-readable storage medium having stored thereon instructions for performing a method, comprising machine executable code which, when executed by a machine, causes the machine to:
    generate Wireless Internet Service Provider ("WISP") voucher codes and associated WISP data into a loadable package to establish Internet connections on a plurality of aircrafts;

utilize the associated WISP data to selectively load a subset of WISP voucher codes to an aircraft;

deploy a WISP voucher code from the subset for each passenger seat on the aircraft, based on an event;

update a data structure upon deployment of each WISP voucher code to indicate deployed and unused WISP voucher codes of the subset;

present the WISP voucher code to each passenger seat;

determine that a number of unused WISP voucher codes of the subset have reached a threshold value;

obtain additional WISP voucher codes for the aircraft; and delete the WISP voucher code associated with each passenger seat, upon flight termination.

9. The non-transitory machine-readable storage medium of claim 8, wherein the event is based on flight status.

10. The non-transitory machine-readable storage medium of claim 8, wherein the event is based on a flight altitude.

11. The non-transitory machine-readable storage medium of claim 8, wherein the machine executable code which when executed by the at least one machine, further causes the at least one machine to:

notify a crew device, in response to reaching the threshold value.

12. The non-transitory machine-readable storage medium of claim 8, wherein the additional WISP voucher codes are obtained from a ground computing system.

13. The non-transitory machine-readable storage medium of claim 8, wherein the machine executable code which when executed by the at least one machine, further causes the at least one machine to:

utilize the associated WISP data for loading a certain number of WISP voucher codes to each of the plurality of aircrafts uniquely identified by the associated WISP data.

14. The non-transitory machine-readable storage medium of claim 8, wherein the machine executable code which when executed by the at least one machine, further causes the at least one machine to:

retrieve, by an application programming interface, the WISP voucher code of each passenger seat from a computing system of the aircraft.

15. A system, comprising:
a memory containing non-transitory machine readable storage medium comprising machine executable code having stored thereon instructions; and
a processor of a first node coupled to the memory, the processor configured to execute the machine executable code to:

generate Wireless Internet Service Provider ("WISP") voucher codes and associated WISP data into a loadable package to establish Internet connections on a plurality of aircrafts;

utilize the associated WISP data to selectively load a subset of WISP voucher codes to an aircraft;

deploy a WISP voucher code from the subset for each passenger seat on the aircraft, based on an event;

update a data structure upon deployment of each WISP voucher code to indicate deployed and unused WISP voucher codes of the subset;

present the WISP voucher code to each passenger seat;

determine that a number of unused WISP voucher codes of the subset have reached a threshold value;

obtain additional WISP voucher codes for the aircraft; and delete the WISP voucher code associated with each passenger seat, upon flight termination.

16. The system of claim 15, wherein the event is based on flight status.

17. The system of claim 15, wherein the event is based on a flight altitude.

18. The system of claim 15, wherein the machine executable code further causes to:

notify a crew device, in response to reaching the threshold value.

19. The system of claim 15, wherein the machine executable code further causes to:

utilize the associated WISP data for loading a certain number of WISP voucher codes to each of the plurality of aircrafts uniquely identified by the associated WISP data.

20. The system of claim 14, wherein the machine executable code further causes to:

retrieve, by an application programming interface, the WISP voucher code of each passenger seat from a computing system of the aircraft.

\* \* \* \* \*